US008458076B1

(12) United States Patent
Masyukov et al.

(10) Patent No.: US 8,458,076 B1
(45) Date of Patent: Jun. 4, 2013

(54) SYSTEM AND METHOD FOR CALIBRATING A SURFACE THAT REQUIRES SMOOTHNESS

(75) Inventors: Ivan V. Masyukov, Westwood, NJ (US); Clifton T. Wall, Milburn, NJ (US)

(73) Assignee: Morgan Stanley, New York, NY (US)

( * ) Notice: Subject to any disclaimer, the term of this patent is extended or adjusted under 35 U.S.C. 154(b) by 485 days.

(21) Appl. No.: 12/396,840

(22) Filed: Mar. 3, 2009

(51) Int. Cl.
*G06Q 40/00* (2006.01)

(52) U.S. Cl.
USPC .............................................. 705/37; 705/35

(58) Field of Classification Search
USPC .......................................................... 705/37
See application file for complete search history.

(56) References Cited

U.S. PATENT DOCUMENTS

| | | | |
|---|---|---|---|
| 6,456,982 B1 * | 9/2002 | Pilipovic .................... | 705/36 R |
| 6,546,375 B1 * | 4/2003 | Pang et al. .................. | 705/37 |
| 2002/0103738 A1 * | 8/2002 | Griebel et al. ................ | 705/36 |
| 2003/0014355 A1 * | 1/2003 | Browne et al. ................ | 705/38 |
| 2007/0133746 A1 * | 6/2007 | Ortiz Aleman et al. ........ | 378/59 |
| 2007/0271547 A1 * | 11/2007 | Gulko et al. .................. | 717/106 |

OTHER PUBLICATIONS

Thomas Sederberg, "An Introductin to B-Spline Curves", Mar. 14, 2005.*
Jim Gatheral, "The Volatility Surface: A Practitioner's Guide", Wiley and Sons, Inc., Hoboken, NJ, 2006. Chapters 8, 11 and bibliogrpahy.*
Coleman, Thomas, Li, Yuying, Verman, Arun. "Reconstructing the Unknown Local Volatility Function (1998)" Computer Science Department and Cornell Theory Center, Cornell University, Ithaca, NY. [downloaded Apr. 22, 2011].*
Achdou, Yves and Oliver Pironneau, "Volatility Calibration with American Options", European Congress on Computational Methods in Applied Sciences and Engineering, Jul. 24-28, 2004, eds. Neittaanmaki et al., pp. 1-14.
Choy et al., "Correlating Market Models", 10 pages.
Danquah et al., "Local Volatility Calibration using the "Most Likely Path"", Computational Methods in Finance, Dec. 19, 2006, 16 pages.
Detlefsen, K. and W.K. Härdle, "Calibration Design of Implied Volatility Surfaces", Journal of Data Science, vol. 6, 2008, pp. 303-312.

* cited by examiner

*Primary Examiner* — Elda Milef
*Assistant Examiner* — Joan Goodbody
(74) *Attorney, Agent, or Firm* — K&L Gates LLP

(57) ABSTRACT

Computer-based systems and methods for calibrating a surface. The surface may be a 1-D or multi-D surface, such as a volatility grid used to price financial instruments whose price depends on volatility. The computer system may comprise: a database that stores calibration input data; a processor in communication with the database; and a memory in communication with the processor. The memory stores instructions which when executed by the processor causes the processor to calculate entries for a vector representing the surface based on the calibration input data. The entries for the vector representing the surface are calculated based on a product of a matrix of a set of basis functions and a vector of coefficients for the set of basis functions, where entries for the vector of coefficients are determined based on the calibration input data. In various implementations, the set of basis functions comprises a set of b-spline basis functions.

31 Claims, 6 Drawing Sheets

SYSTEM AND METHOD FOR CALIBRATING A SURFACE THAT REQUIRES SMOOTHNESS

BACKGROUND

Traders often price illiquid financial instruments whose price depends on volatility, such as illiquid options, based on a pricing model that uses, in part, a two-dimensional volatility surface (or grid). The volatility surface typically is calibrated based on liquid financial instruments, and more accurate pricing is obtained when the calibrated surface is smooth, so that sharp, isolated spikes in the surface do not cause distorted pricing outputs from the pricing model.

Presently, typically about fifty (50) liquid instruments are used to calibrate a volatility grid, but the grids typically include on the order of 20,000 points (or pixels). This presents an ill-posed inverse problem to calibrate the surface. Currently employed techniques to calibrate the surface are computationally intensive and complex, and still do not often produce smooth results.

For example, in one known technique for calibrating a volatility grid ("volgrid"), because different calibration instruments will depend, in general, on different areas (combinations of pixels) of the volgrid, non-overlapping partition areas covering sensitivity areas of the calibration instruments are defined. For reasonably selected instruments, it is possible to calibrate the volgrid by applying parallel shifts of the volgrid surface in those areas. Because the resulting volgrid will be discontinuous, it can be smoothed, and calibrated again. The iterations may be repeated until the process converges. In another known technique, volgrid elements are adjusted at each calibration step by solving a large-scale optimization problem, based on a large Jacobian size matrix (comprising sensitivities of instrument prices to changes of volgrid elements) and a smoothness penalty function. Both of these known techniques are computationally intensive, time consuming, and complex.

SUMMARY

In one general aspect, the present invention is directed to computer-based systems and methods for calibrating a surface, such as a volgrid used to price financial instruments whose price is dependent upon volatility (such as options). The surface may be, for example, a one-dimensional or multi-dimensional surface. According to various embodiments, the computer system may comprise: a computer database that stores calibration input data; one or more processor circuits in communication with the database; and one or more memory circuits in communication with the one or more processor circuits. The memory circuit(s) stores instructions which when executed by the processor circuit(s) causes the processor circuit(s) to calculate entries (or elements) for a vector representing the surface (or volgrid) based on the calibration input data. When used to calibrate a volgrid, the calibration input data comprises data regarding calibration financial instruments, e.g., liquid financial instruments. The entries for the vector representing the surface are calculated based on a product of a matrix of a set of basis functions and a vector of coefficients for the set of basis functions, where entries (or elements) for the vector of coefficients are determined based on the calibration input data. In various implementations, the set of basis functions comprises a set of b-spline basis functions, and in particular, may comprise cubic b-spline basis functions.

Embodiments of the present invention provide advantages over prior art techniques for calibrating volgrids or other surfaces. For example, in various embodiments, the computations involved in calibrating the volgrid are much less intensive than in the prior art, which allows the technique of the present invention to be run more often, such as in real-time, and with less consumption of computing power. These and other advantages of the present invention will be apparent from the description below.

FIGURES

Various embodiments of the present invention are described herein by way of example in conjunction with the following figures, wherein.

DESCRIPTION

Figure 1:
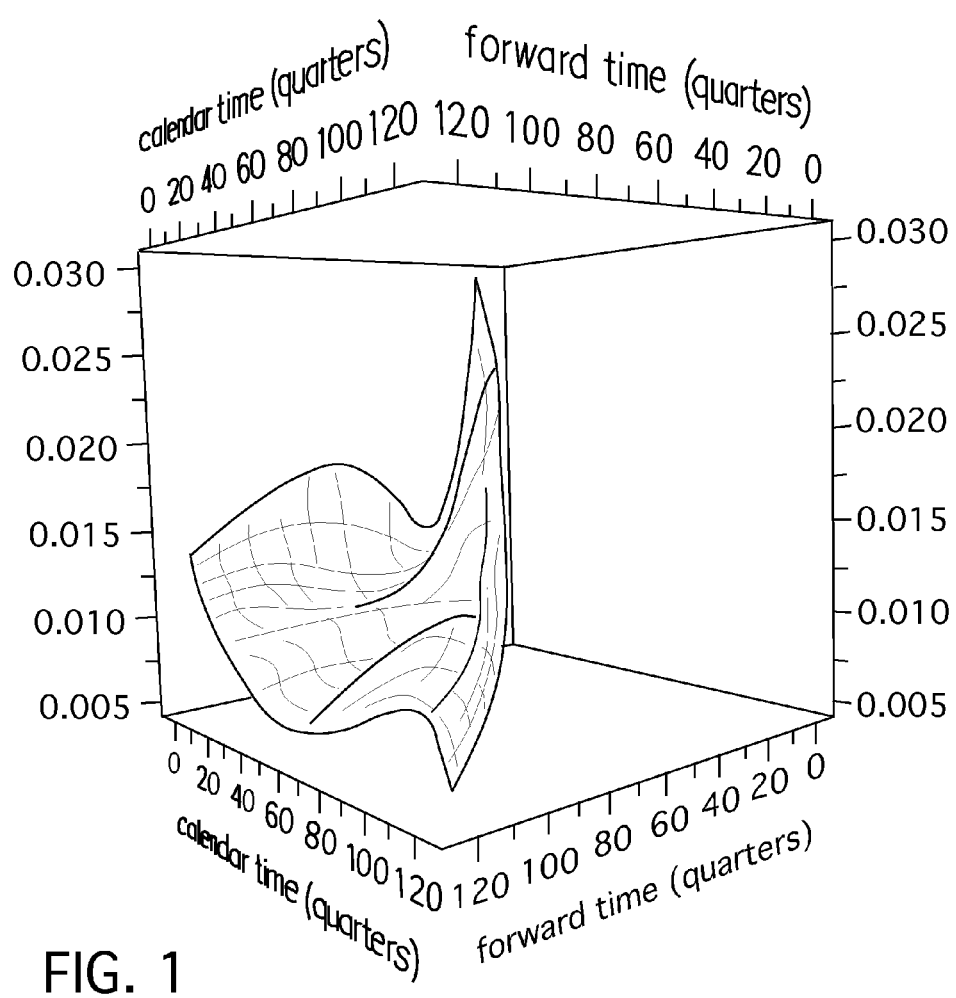
FIG. 1 illustrates a volatility grid.

In one general aspect, the present invention is directed to systems and methods for calibrating a surface (e.g., a one-dimensional (1-D) or two-dimensional (2-D) surface or multi-dimensional surface). The surface may be, for example, a volatility surface or volatility grid (sometimes referred to herein as "volgrid") that is used to price financial instruments whose price is dependent on volatility, such as options. A sample volgrid is shown in FIG. 1. In the illustrated example, the x-axis represents forward time, the y-axis represents calendar time, and the z-axis represents volatility. Based on the volgrid, traders can estimate the volatility for illiquid financial instruments whose price is dependent on volatility, and the estimated volatility can be used to price the illiquid financial instruments. Although aspects of the present invention are described generally herein in the context of calibration a volgrid for financial instruments, it should be recognized that the embodiments described herein are not so limited and that aspects of the present invention could be used to calibrate any surface that requires a degree of smoothness, including both 1-D, 2-D, and multi-dimensional surfaces.

For an embodiment used to calibrate a volgrid for an option or other financial instrument whose price is related to the volatility of the instrument, the volatility grid may be modeled as:

$$v = v_0 + B \cdot x \tag{1}$$

where v is a vector containing values related to the volatility, $v_0$ is a vector containing values related to a base volatility grid, B is a matrix of basis functions, and x is a vector of coefficients for matrix B. Preferably, the vector v and $v_0$ are log vectors, containing entries that are the log of the volatility values. The base volatility grid, $v_0$, may be any suitable volatility grid, such as flat volatility grid or the volatility grid resulting from previous calibration. The matrix of basis functions B may comprise a set of basis functions that describe possible variations of the volatility grid. Preferably, the sum of all of the basis functions equals a vector of ones (i.e., $$\sum_j B_{ij} = 1$$

for all i, where $B_{ij}$ is the $ij^{th}$ entry of matrix B). When used for a volgrid for financial instruments, the basis functions preferably provide smooth results and may provide more detail for short time horizons than for longer time horizons. In one embodiment, the cubic b-spline basis functions could be used for B, although in other embodiments, different b-spline functions or different basis functions could be used.

Given m+1 values, called knots, with $$t_0 \leq t_1 \leq \ldots \leq t_m, \; t_i \in [0,1]$$

a b-spline of degree n is a parametric curve $$S:[t_0, t_m] \to R^2$$

composed of basis b-splines of degree n $$S(t) = \sum_{i=0}^{m-n-1} P_i b_{i,n}(t), \; t \in [t_n, t_{m-n}]$$

The $P_i$ are called control points or de Boor points (there are m−n control points). A polygon can be constructed by connecting the de Boor points with lines, starting with $P_0$ and finishing with $P_{m-n-1}$. The m−n basis b-splines of degree n can be defined using the Cox-de Boor recursion formula:

$$b_{j,0}(t) := \begin{cases} 1 & \text{if } t_j \leq t \leq t_{j+1} \\ 0 & \text{otherwise} \end{cases}$$

$$b_{j,n}(t) := \frac{t - t_j}{t_{j+n} - t_j} b_{j,n-1}(t) + \frac{t_{j+n+1} - t}{t_{j+n+1} - t_{j+1}} b_{j+1,n-1}(t)$$

Regarding cubic b-splines, a b-spline formulation for a single segment can be written as:

$$S_i(t) = \sum_{k=0}^{3} P_{i-3+k} b_{i-3+k,3}(t); \; t \in [0, 1]$$

where $S_i$ is the ith b-spline segment and P is the set of control points, segment i and k is the local control point index. A set of control points would be $P_i^w = (w_i x_i, w_i y_i, w_i z_i, w_i)$ where $w_i$ is a weight. An entire set of segments, m−2 curves ($S_3, S_4, \ldots, S_m$) defined by m+1 control points ($P_0, P_1, \ldots, P_m$, $m \geq 3$), as one b-spline in t would be defined as:

$$S(t) = \sum_{i=0}^{m} P_i b_{i,3}(t)$$

where i is the control point number and t is a global parameter giving knot values. This formulation expresses a b-spline curve as a linear combination of b-spline basis functions.

Returning to equation (1), with $v_0$ and B known, the vector v can be determined once the elements of the vector x are determined, as described further below. The coefficients for vector x may be determined based on the calibration instruments, as described below. If $q_{mdl}$ and $q_{mkt}$ are vectors containing the pricing model and market prices respectively for the calibration instruments, then the following two vectors, q and $q_{in}$, can be defined, where $q_0$ is a vector of the base prices for the calibration instruments:

$$q = \ln \frac{q_{mdl}}{q_0}, \quad q_{in} = \ln \frac{q_{mkt}}{q_0}.$$

From the vectors, the entries for a Jacobian matrix J can be determined based on:

$$q = J \cdot x \tag{2}$$

$$\Rightarrow J_{ij} = \frac{\partial q_i}{\partial x_j} \tag{3}$$

where $J_{ij}$ is the $ij^{th}$ entry of matrix J, $q^i$ is the log price of the $i^{th}$ calibration instrument, and $x_j$ is the coefficient for the $j^{th}$ basis function. The Jacobian matrix J contains entries that represent the sensitivity of the various calibration instrument prices to the volgrid perturbations corresponding to different basis functions associated with B. Known mathematical techniques, such as the Finite Difference method, can be used for determining J.

Once J is determined, the coefficients for x in equation (1) may be determined based on the following formulation:

$$x = \arg \text{mid} \{ \|W(Jx - q_{in})\|^2 + \|\lambda_1 L_1 Bx\|^2 + \|\lambda_2 L_2(v_0 + Bx)\|^2 + \|\lambda_3 L_3 x\|^2 \} \tag{4}$$

where W is a diagonal matrix of weights that weight the more important calibration instruments greater than the other calibration instruments, $L_1$ is a regularization matrix for change, $L_2$ is a regularization matrix of result, $L_3$ is a Tikhonov regularization matrix, $\lambda_1$ is a regularization parameter for $L_1$, $\lambda_2$ is a regularization parameter for $L_2$, and $\lambda_3$ is a regularization parameter for $L_3$. $L_1$ may provide gradient smoothness for the change of calibrated surface and $L_2$ may provide radial smoothness of the resulting surface. For example, in various embodiments, $L_1$ and $L_2$ may have the general forms shown below:

$$L_1 = \begin{bmatrix} 1 & -1 & 0 & 0 & 0 & 0 & \ldots & 0 & 0 & 0 \\ 0 & 1 & -1 & 0 & 0 & 0 & \ldots & 0 & 0 & 0 \\ \ldots & \ldots & \ldots & \ldots & \ldots & \ldots & \ldots & \ldots & \ldots & \ldots \\ 0 & 1 & 0 & -1 & 0 & 0 & \ldots & 0 & 0 & 0 \\ 0 & 0 & 0 & 0 & 1 & 0 & \ldots & -1 & 0 & 0 \end{bmatrix}$$

$$L_2 = \begin{bmatrix} a_1 & b_1 & c_1 & 0 & 0 & 0 & \ldots & 0 & 0 & 0 \\ \ldots & \ldots & \ldots & \ldots & \ldots & \ldots & \ldots & \ldots & \ldots & \ldots \\ 0 & a_n & 0 & 0 & b_n & 0 & \ldots & 0 & c_n & 0 \end{bmatrix}$$

The values for $\lambda_1$ and/or $\lambda_2$ may be set or input by a user, as described further below, to control the gradient smoothness and/or radial smoothness respectively.

A solution for x in equation (4) above is:

$$x = A \cdot (J^T W^2 q_{in} + \lambda_2 (L_2 B)^T L_2 v_0) \tag{5}$$

where $$A = (J^T W^2 J + \lambda_1^2 (L_1 B)^T L_1 B + \lambda_2^2 (L_2 B)^T L_2 B + \lambda_3^2 L_3^T L_3)^{-1} \tag{6}$$

Thus, once determined, the vector x of basis function coefficients can be used in equation (1) to determine v.

An advantage of the above-described algorithm for determining v is that the number of basis functions, equal to the length of vector x, can be much smaller than the number of elements (pixels) of volgrid, equal to the length of vector v, in current techniques, making computations less intensive than computations involved in calibrating volgrids in the prior art.

Figure 2:
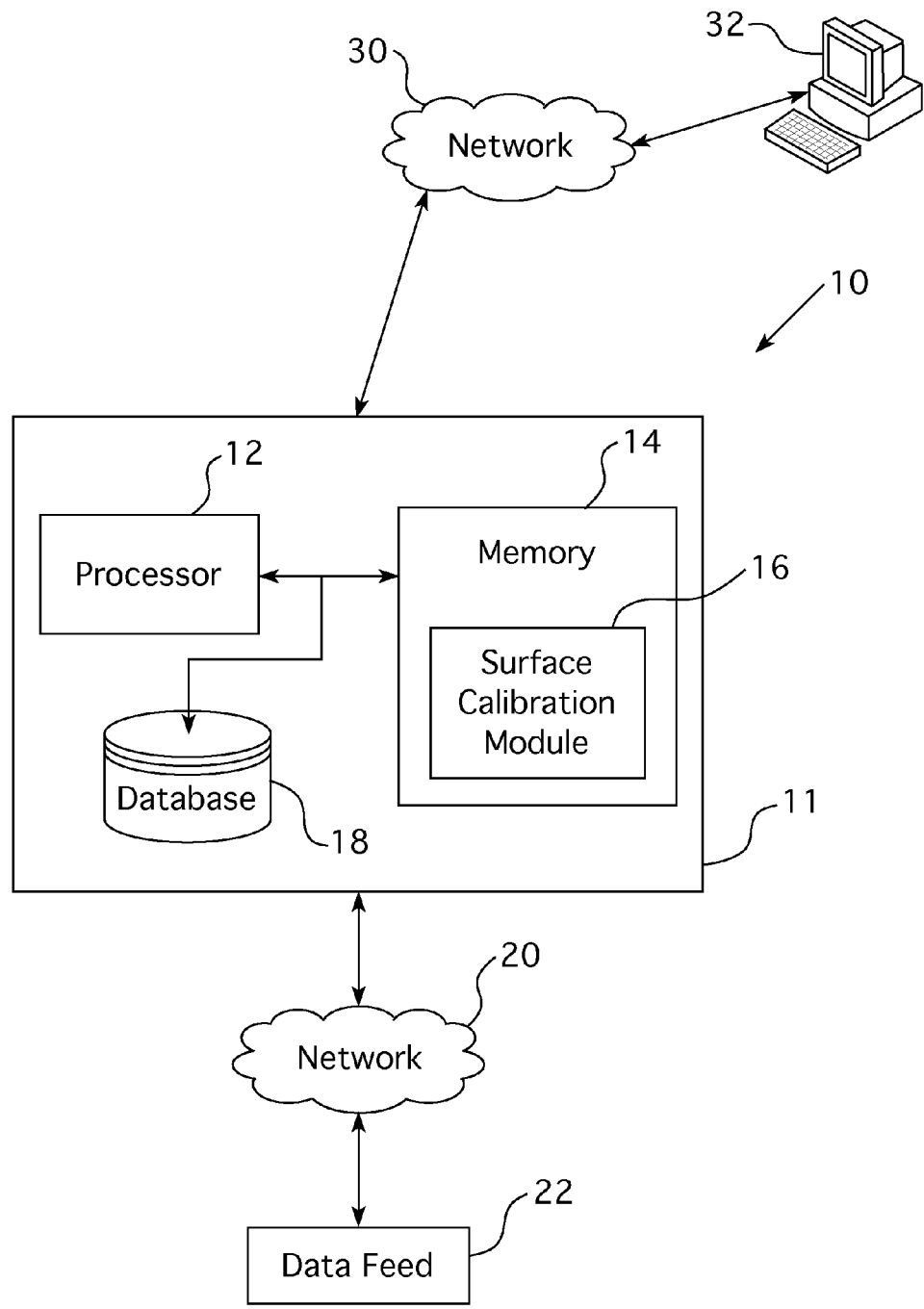
FIG. 2 is a block diagram of a computer system according to various embodiments of the present invention.

FIG. 2 is a diagram of an electronic computer system 10 that may be used to compute v and to graphically display the volgrid corresponding to v. The computer system 10 may be implemented as one or a number of networked electronic computing devices 11, such as desktop computers, laptop computers, servers, mainframes, workstations, handheld computer devices, smartphones, etc. The computer device 11 may comprise one or more processors 12 and one or more computer memories 14. The processors 12 and the computer memories 14 may be formed using integrated circuits. In one embodiment, the processor(s) 12 and the computer memory(ies) 14 may comprise separate integrated circuits, although in other embodiments they may be combined in a common integrated circuit. For convenience, only one processor 12 and only one memory 14 are shown in FIG. 2. The processor 12 may have one or multiple cores. The memory 14 may comprise a read only memory (ROM) and random access memory (e.g., a DRAM). The computer system 10 also comprises an electronic computer database 18 that stores relevant data for calibrating the surface, such as the values for the calibration inputs. For example, where the computer system 10 is used to calibrate a volgrid for a financial instrument, the calibration inputs may comprise the prices and/or volatilities for the calibration instruments. In one embodiment, the computer system 10 may receive the data for the calibration inputs over an electronic computer network 20 (such as a WAN or LAN) from a data feed 22. Relevant data from the data feed may be stored in the database 18. The database 18 may comprise a computer-based database management system (DBMS) (not shown) to organize and store the data.

The memory 14 may comprise a surface calibration software module 16. The surface calibration software module 16 may comprise computer instructions that, when executed by the processor 12, cause the processor 12 to calibrate the surface based on the calibration inputs stored in the database 18 according to the algorithm described above (e.g., see equations (1) to (66)). The computer system 10 may store the values for v in a store or memory associated with the computer system 10. In addition, the computer system 10 may transfer the values for v, such as in a file, to another computer system 30 via a network 32.

Figure 3:
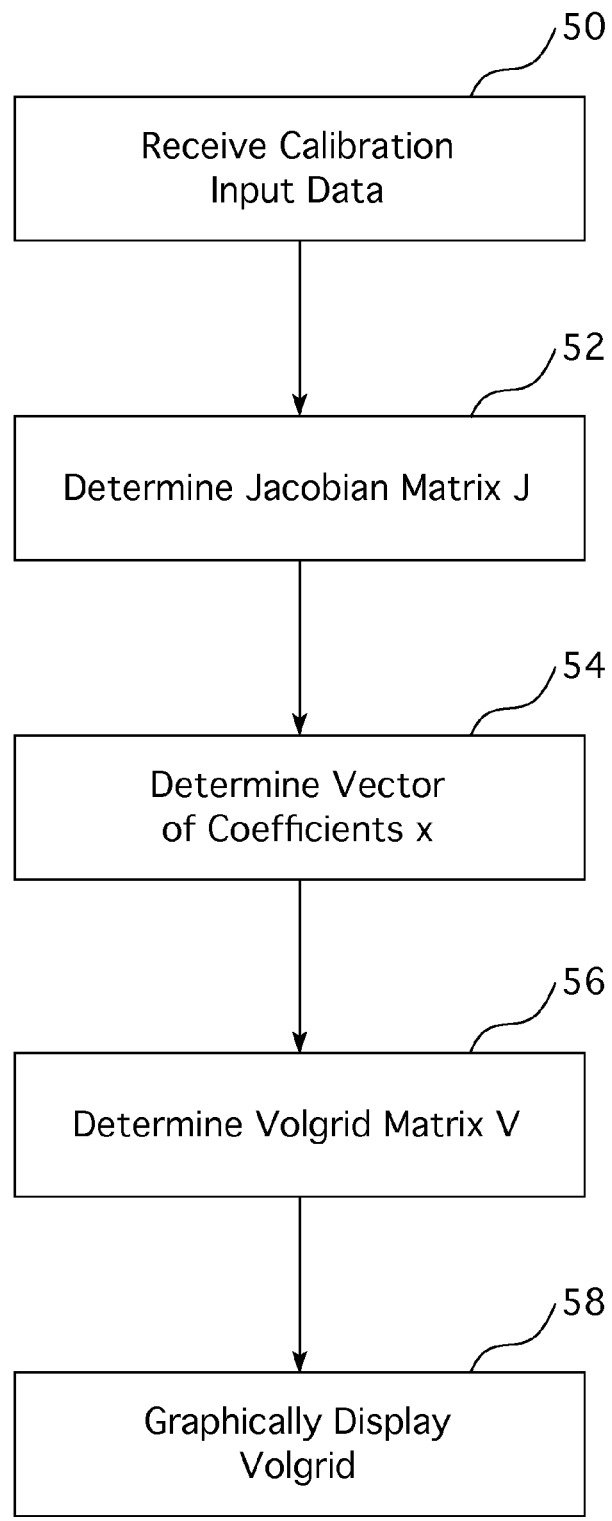
FIG. 3 is a flowchart illustrating a process according to various embodiments of the present invention.

FIG. 3 is a diagram of the process flow of the computer system 10 according to various embodiments of the present invention. At step 50, the computer system 10 receives the data for the calibration inputs. As mentioned above, where the computer system 10 is used to calibrate a volgrid, the calibration data may include market prices for a number of different calibration instruments. In various embodiments, there may be five (5) to fifty (50) or more calibration instruments, depending on the applicable market, with more calibration instruments generally being better than less when used to compile a volgrid for options. The calibration instruments preferably comprise liquid, at-the-money options, such as a number of different swaptions and/or caps or floors. In addition, the calibration input data may comprise model prices for the calibration instruments. A suitable pricing model may be used to calculate the model prices. The data may be stored in the database 18.

At block 52, the computer system 10 determines the entries of the Jacobian matrix J (see equations (2) and (3) above). Next, at block 54, the computer system 10 determines the coefficients for x using equations (5) and (6) above. As mentioned above, input data computing the coefficients for x include the market, model, and base prices for the calibration instruments, and the regularization parameters $\lambda_1$ and $\lambda_2$. These values may be stored in the database 18 or some other file or store associated with the computer system 10. In addition, a user may input the regularization parameters $\lambda_1$ and $\lambda_2$, as described further below.

Next, at block 56, the computer system 10 determines entries for v using equation (1) above. Next, at block 58, the computer system 10 may generate a graphical display of the volgrid based on v that may be displayed on a monitor, such as the monitor of computer system 30. The computer system 10 may store the entries for v in a file, database, or memory associated with the computer system 20 and/or transmit the entries for v via an electronic computer network to a remote computer system, such as computer system 30. The computer network may comprise a LAN or a WAN, for example.

Figure 4:
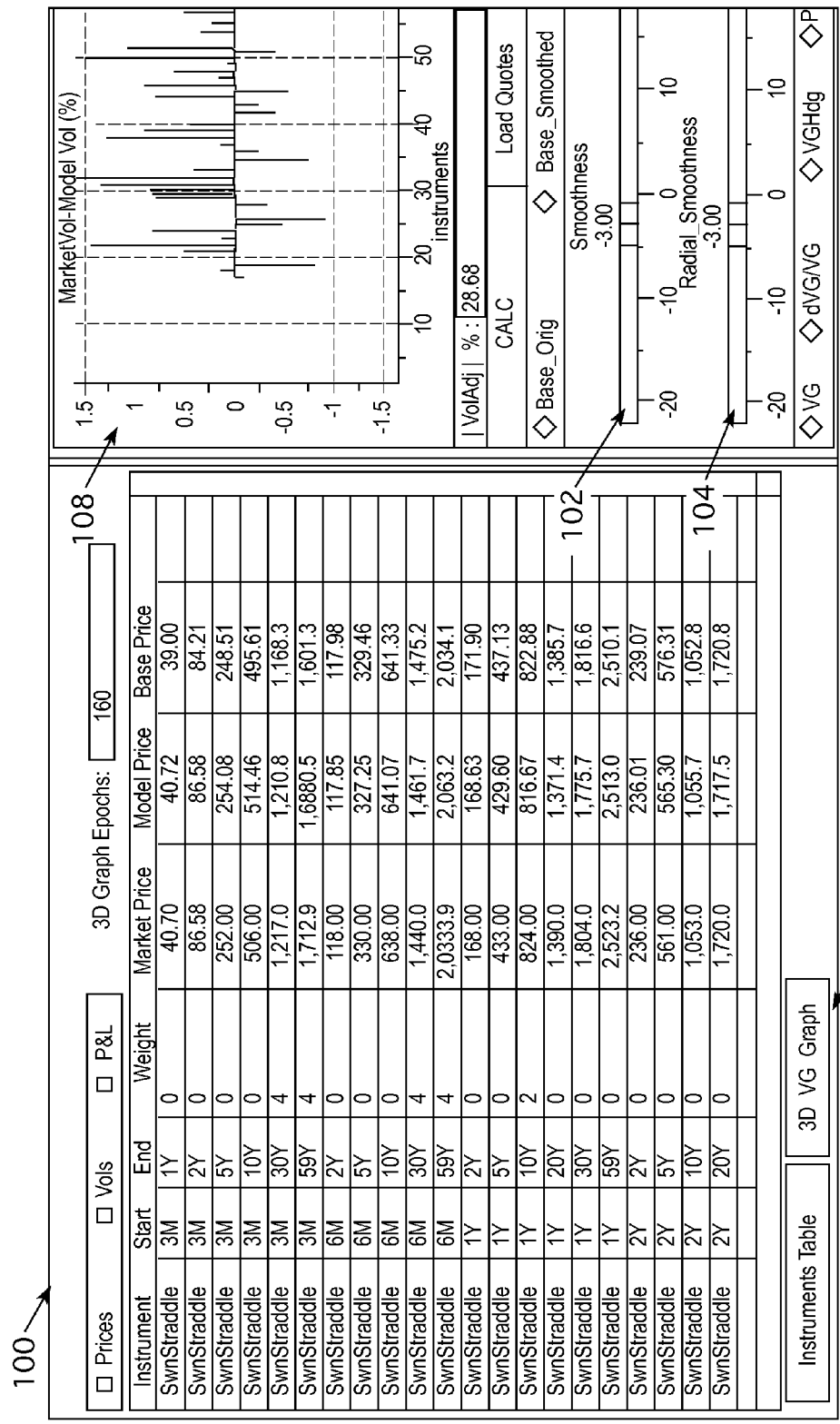
FIGS. 4 and 5 are screen shots of a user interface according to various embodiments of the present invention.
Figure 5:
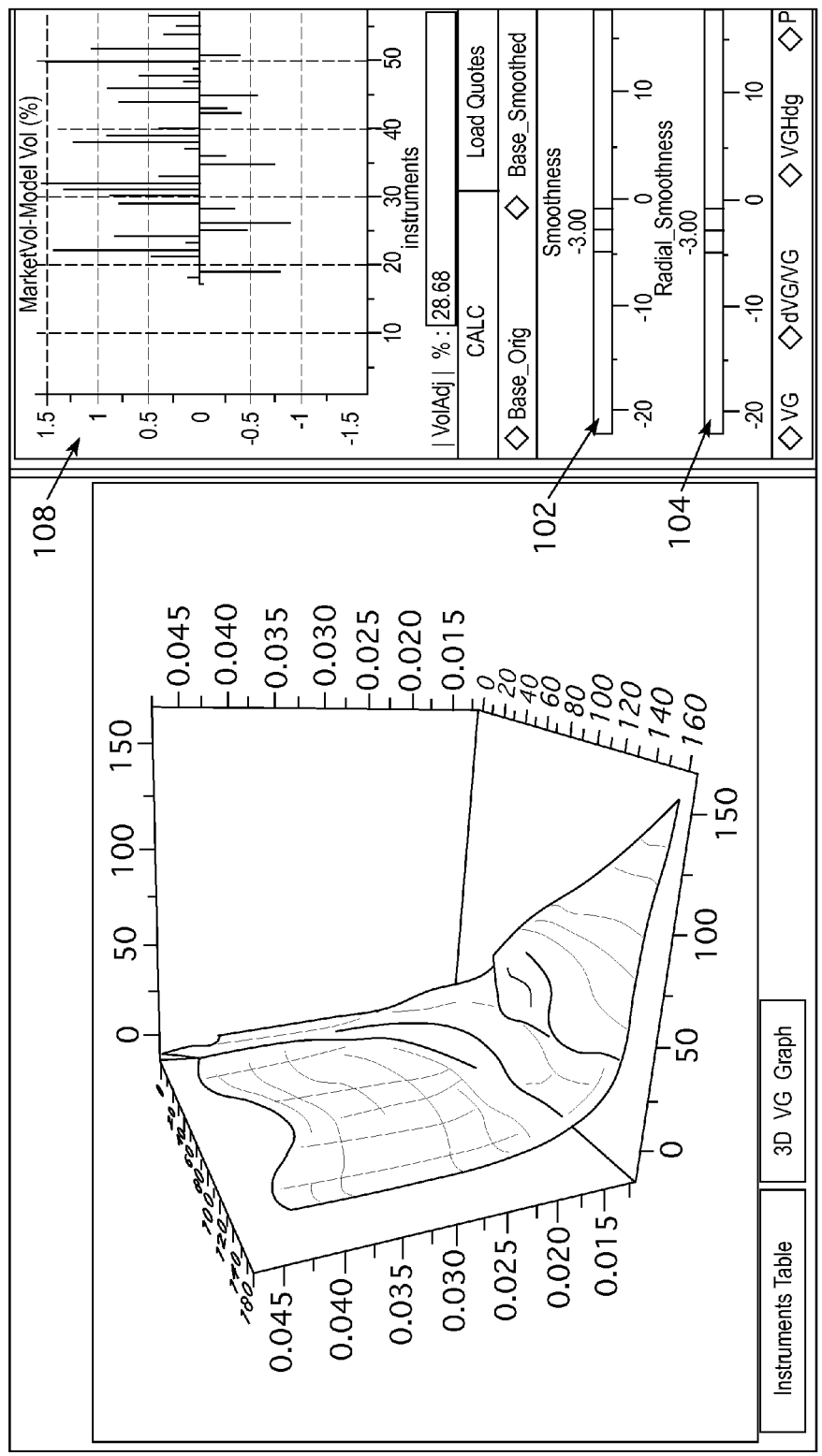

FIG. 4 is an example screen shot according to various embodiments that a user, at remote computer system 30, for example, may use to view the calibrated volgrid and to set the regularization parameters $\lambda_1$ and $\lambda_2$ for example. The table 100 in FIG. 4 shows the market price, model price, and base price for some of the calibration instruments. Using the sliders 102, 104, the user can set the regularization parameters $\lambda_1$ and $\lambda_2$. The smoothness slider 102 corresponds to regularization parameter $\lambda_1$ and the radial smoothness slider 104 corresponds to the regularization parameter $\lambda_2$ in this example. Of course, in other embodiments, other user input means for setting the regularization parameters could be used, such as text fields, drop down windows, etc. As shown in FIG. 5, the user may view the graphical representation of the volgrid by clicking the "3DVG Graph" tab 106. Also, the graph 108 may indicate how well the various calibration instruments fit the market; that is, it may show the difference between the market volatility (or price) and the model volatility (or price) for the calibration instruments.

Figure 6:
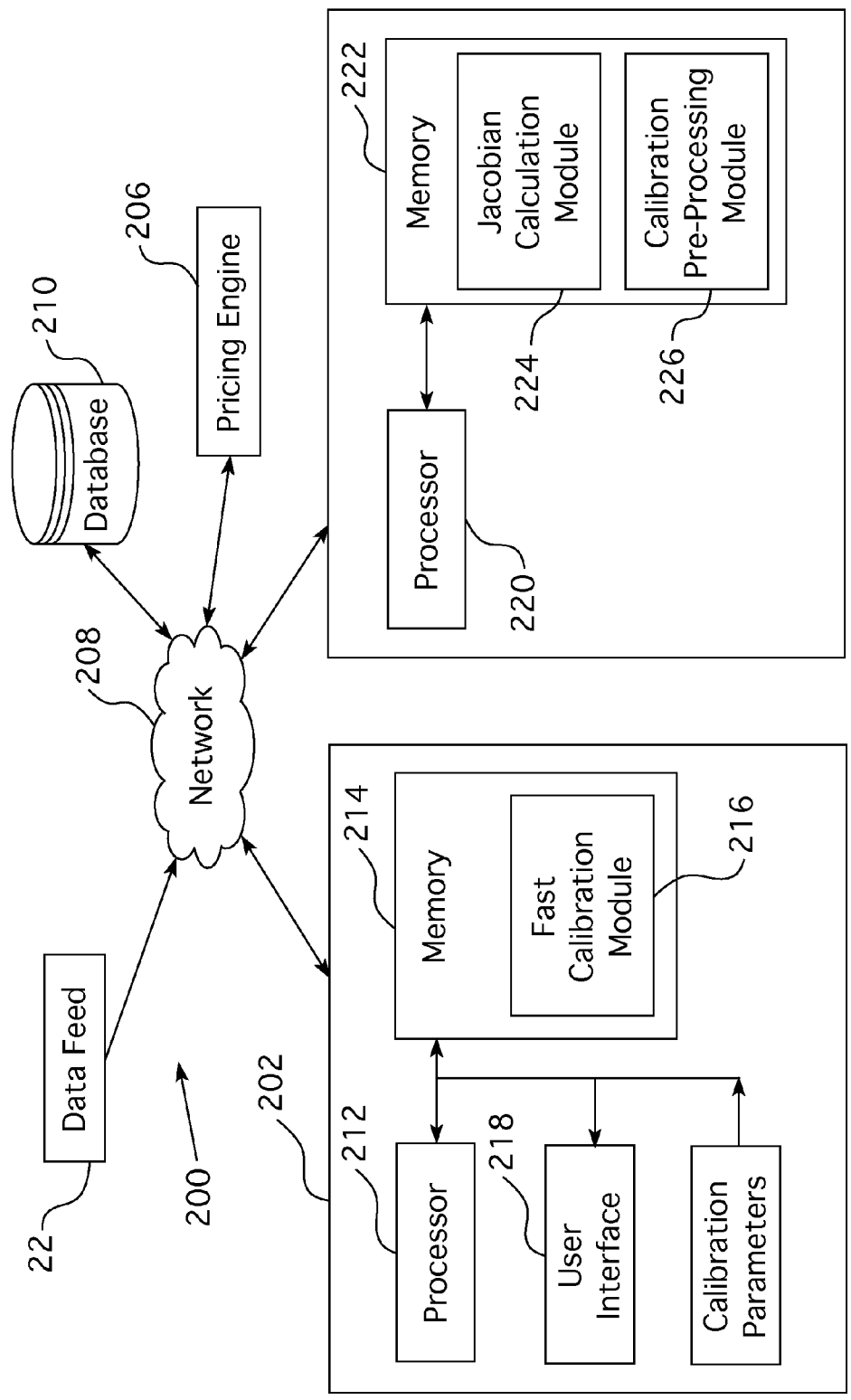
FIG. 6 is a diagram of a computer system according to other embodiments of the present invention.

FIG. 6 is a diagram of a computer system 200 for calibrating a surface, such as a volatility grid, according to other embodiments. As shown in FIG. 6, the system 200 may comprise a first computer device 202, a second computer device 204, and a computerized pricing engine 206. The computer devices 202, 204, 206 may be connected by an electronic computer network 208, which may comprise a LAN, a WAN, and/or any other type of suitable electronic computer network. The computer devices 202, 204, 206 may be implemented as desktop computers, laptop computers, servers, mainframes, workstations, handheld computer devices, smartphones, etc. The computer devices 202, 204, 206 may also be in communication with an electronic computer database system 210 via the network 208.

The first computer device 202 may comprise one or more processor circuits 212 and one or more memory circuits 214. The processor(s) 212 and the computer memory circuit(s) 214 may be implemented as one or more integrated circuits. The memory circuit 214 may comprise a fast calibration module 216. The fast calibration module 216 may comprise computer software that, when executed by the processor 212, cause the processor 212 to perform calculations to calibrate the volatility grid (e.g., the elements of vector v in equation (1)). The fast calibration module 216 may cause the processor 212 to perform the calculations in response to real-time market data feeds, from data feed 22, for the calibration instruments. The fast calibration module 216 also performs the calculations using the regularization parameters $\lambda_1$ and $\lambda_2$, supplied by the user via the user interface 218 (see FIG. 4, for example). A graphical representation of the calibrated volatility surface may be displayed visually to the user on the user interface 218. In addition, the volatility surface (e.g., the elements of vector v) may be stored in the database 210 or some other file or database, and may be output to the pricing engine 206, which uses the volgrid to price financial instruments.

The second computer device 204 also may comprise one or more processor circuits 220 and one or more memory circuits 222. The processor(s) 220 and the computer memory circuit(s) 222 may be implemented as one or more integrated circuits. In the illustrated embodiment, the memory circuit 222 comprises a Jacobian calculation module 224 and a calibration pre-processing module 226. The modules 224, 226 may be implemented as software code stored in the memory 222 that is executed by the processor 220. When the processor 220 executes the code of the Jacobian calculation module 224, the processor 220 may calculate the Jacobian matrix J. The Jacobian matrix J may be calculated as per equations (2) and (3) above and the associated text. The Jacobian matrix J is calculated based on the calibration instruments and the basis functions. Data regarding the calibration instruments to calculate J may be stored in the database 210. In addition, the selected basis functions B may be stored in the database 210. The Jacobian may be calculated infrequently and stored in a memory of the first computer device 202, the second computer device 204, and/or the database 210.

In various embodiments, every time the Jacobian is updated, the calibration pre-processing module 226, when executed by the processor 220, may cause the processor 220 to perform time-consuming calculations that involve the Jacobian and that are used in the calculation of the volgrid. For example, in one embodiment, the calibration pre-processing module 226 may pre-compute the quantity $(L_2B)^T L_2 v_0$ in equation (5) above and/or the quantities (i) $(L_1B)^T L_1 B$, (ii) $(L_2B)^T L_2 B$, and (iii) $L_3^T L_3$ in equation (6). The results of these calculations may be supplied to the fast calibration module 216 of the first computer device 202 for calculation of the volgrid. The calculation results may be stored in the memory of the first computer device 202, the second computer device 204, and/or the database 210.

The pricing engine 206 may be implemented as one or more networked computer devices, such as desktop computers, laptop computers, servers, mainframes, workstations, handheld computer devices, smartphones, etc. The pricing engine 206 may comprise one or more processors and one or more memory devices. The pricing engine 206 may be programmed to calculate prices for financial instruments whose price depends on volatility. The pricing engine 206 may use the volatility grid calculated by the first computer device 202 and market data (from the data feed and/or the database 210) to calculate the prices for the instruments, which may be illiquid options, for example. Techniques for calculating prices for illiquid instruments using a calibrated volgrid are known in the art.

In various embodiments, the user may input the calibration parameters via the first computer device 202. The second computer device 204 and the pricing engine 206 may be located remotely from the first computer device 202. In other embodiments, the first and second computer devices 202, 204 may be combined in one computer device that has the fast calibration module 216, the Jacobian calculation module 224, and the calibration pre-processing module 226. In yet other embodiments, the Jacobian calculation module 224 and the calibration pre-processing module 226 may be implemented in one software module. In yet other embodiments, the modules 216, 224, 226 may be implemented in one software module.

In various embodiments, therefore, the present invention is directed to a computer system for calibrating a surface. The computer system may comprise: an electronic computer database 18 that stores calibration input data electronically; an electronic processor circuit 12 in communication with the database 18; and an electronic memory circuit 14 in communication with the processor circuit 12. The memory circuit 14 stores instructions which when executed by the processor circuit 12 causes the processor circuit 12 to calculate entries for a vector v representing the surface based on the calibration input data. The entries for the vector v representing the surface are calculated based on a scalar product of a matrix B of a set of basis functions and a vector x of coefficients for the set of basis functions, where entries for the vector x of coefficients are determined based on the calibration input data. In various implementations, the set of basis functions comprises a set of b-spline basis functions, and in particular, may comprise cubic b-spline basis functions. The computer system could be used to calibrate any surface, including 1-D, 2-D, and multi-dimensional surfaces, such as volatility grids using for pricing financial instruments whose price is dependent on volatility. In that case, the calibration input data may comprise market price data and model price data for calibration instruments, wherein the calibration instruments preferably comprise liquid, at-the-money types of options.

In another embodiment, the present invention is directed to a computer-implemented method for calibrating a surface. The method may comprise the steps of: (i) storing calibration input data in an electronic computer database 18; and (ii) calculating, by one or more processor circuits 12 in communication with the computer database 18, entries for the vector v representing the surface based on the calibration input data. The entries for the vector v representing the surface may be calculated based on a product of a matrix B of a set of basis functions and a vector x of coefficients for the set of basis functions.

In yet another embodiment, the present invention is directed to a computer product. The computer product comprises a computer readable medium having stored thereon computer code that when executed by an electronic processor circuit implements a method for calibrating a surface, such as a volgrid, based on calibration input data, as described above. The computer product may comprise, for example, the fast calibration module 216, the Jacobian calculation module 224, and the calibration pre-processing module 226.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer system 10 may comprise one or more processors in communication with memory (e.g., RAM or ROM) via data bus. The data bus may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for calibrating a volatility grid for financial instruments whose price is dependent on volatility, the computer system comprising:
   a computer database that stores calibration input data electronically, wherein the calibration input data comprises market price data for a plurality of calibration financial instruments;
   one or more processor circuits in communication with the database; and
   one or more memory circuits in communication with the one or more processor circuits, wherein the one or more memory circuits store instructions which when executed by the one or more processor circuits cause the one or more processor circuits to calculate entries for a vector representing the volatility grid based on the calibration input data, wherein the entries for the vector representing the volatility grid are calculated based on a product of a matrix of a set of basis functions and a vector of coefficients for the set of basis functions, wherein entries for the vector of coefficients are determined based on the calibration input data using a Jacobian matrix and at least one regularization matrix.

2. The computer system of claim 1, wherein the set of basis functions comprises a set of b-spline basis functions.

3. The computer system of claim 2, wherein the set of b-spline basis functions comprises a set of cubic b-spline basis functions.

4. The computer system of claim 3, wherein the calibration financial instruments comprise liquid financial instruments.

5. The computer system of claim 4, wherein the entries for the vector representing the volatility grid, denoted v, are determined based on the equation:

$$v = v_0 + B \cdot x$$

where $v_0$ is a vector representing a base grid, B is the matrix of the set of basis functions, and x is the vector of coefficients for the set of basis functions.

6. The computer system of claim 5, wherein the vector (x) of coefficients for the set of basis functions (B) is determined based on the relation:

$$x = A \cdot (J^T W^2 q_{in} + \lambda_2 (L_2 B)^T L_2 v_0)$$

where $$A = (J^T W^2 J + \lambda_1^2 (L_1 B)^T L_1 B + \lambda_2^2 (L_2 B)^T L_2 B + \lambda_3^2 L_3^T L_3)^{-1}$$

and where:
   J is the Jacobian matrix;
   q is a vector whose entries are related to model prices of the calibration instruments;
   W is a diagonal matrix of weights;

$q_{in}$ is a vector whose entries are related to market prices of the calibration instruments;

$L_1$ is a first regularization matrix $L_2$ is a second regularization matrix;

$L_3$ is a Tikhonov regularization matrix;

$\lambda_1$ is a regularization parameter for $L_i$;

$\lambda_2$ is a regularization parameter for $L_2$; and $\lambda_3$ is a regularization parameter for $L_3$.

7. The computer system of claim 6, wherein the calibration instruments comprise at least one swaption.

8. The computer system of claim 1, wherein the at least one regularization matrix comprises a Tikhonov regularization matrix.

9. The computer system of claim 1, wherein the at least one regularization matrix comprises a regularization matrix that provides gradient smoothness for the volatility grid.

10. The computer system of claim 1, wherein the at least one regularization matrix comprises a regularization matrix that provides radial smoothness for the volatility grid.

11. A computer-implemented method for calibrating a volatility grid for financial instruments whose price is dependent on volatility, the method comprising:
   storing calibration input data electronically in a computer database wherein the calibration input data comprises market price data for a plurality of calibration financial instruments; and
   calculating, by one or more processor circuits in communication with the computer database, entries for a vector representing the volatility grid based on the calibration input data, wherein the entries for the vector representing the volatility grid are calculated based on a product of a matrix of a set of basis functions and a vector of coefficients for the set of basis functions, wherein entries for the vector of coefficients are determined based on the calibration input data using a Jacobian matrix and at least one regularization matrix.

12. The method of claim 11, wherein the set of basis functions comprises a set of b-spline basis functions.

13. The method of claim 12, wherein the set of b-spline basis functions comprises a set of cubic b-spline basis functions.

14. The method of claim 13, wherein the calibration financial instruments comprise liquid financial instruments.

15. The method of claim 14, wherein the entries for the vector representing the volatility grid, denoted V, are determined based on the equation:

$$v = v_0 + B \cdot x$$

where $v_0$ is a vector representing a base grid, B is the matrix of the set of basis functions, and x is the vector of coefficients for the set of basis functions.

16. The method of claim 15, wherein the vector (x) of coefficients for the set of basis functions (B) is determined based on the relation:

$$x = A \cdot (J^T W^2 q_{in} + \lambda_2 (L_2 B)^T L_2 v_0)$$

where $$A = (J^T W^2 J + \lambda_1^2 (L_1 B)^T L_1 B + \lambda_2^2 (L_2 B)^T L_2 B + \lambda_3^2 L_3^T L_3)^{-1}$$

and where:

J is the Jacobian matrix;

q is a vector whose entries are related to model prices of the calibration instruments;

W is a diagonal matrix of weights;

$q_{in}$ is a vector whose entries are related to market prices of the calibration instruments;

$L_1$ is a first regularization matrix;

$L_2$ is a second regularization matrix;

$L_3$ is a Tikhonov regularization matrix;

$\lambda_1$ is a regularization parameter for $L_1$;

$\lambda_2$ is a regularization parameter for $L_2$; and $\lambda_3$ is a regularization parameter for $L_3$.

17. The method of claim 16, wherein the method the calibration instruments comprise at least one swaption.

18. The method of claim 17, further comprising, receiving user inputs for parameters $\lambda_1$ and $\lambda_2$.

19. The method of claim 11, wherein the at least one regularization matrix comprises a Tikhonov regularization matrix.

20. The method of claim 11, wherein the at least one regularization matrix comprises a regularization matrix that provides gradient smoothness for the volatility grid.

21. The method of claim 11, wherein the at least one regularization matrix comprises a regularization matrix that provides radial smoothness for the volatility grid.

22. An apparatus for calibrating a volatility grid for financial instruments whose price is dependent on volatility comprising:
   a computer database that stores calibration input data electronically, wherein the calibration input data comprises market price data for a plurality of calibration financial instruments
   a first computer device in communication with the computer database, wherein the first computer device is programmed to calculate entries for a vector representing the volatility, wherein the entries for the vector representing the volatility grid are calculated based on a product of a matrix of a set of basis functions and a vector of coefficients for the set of basis functions, wherein entries for the vector of coefficients are determined based on the calibration input data using a Jacobian matrix and at least one regularization matrix; and
   a second computer device in communication with the first computer device and the computer database, wherein the second computer device is programmed to calculate the Jacobian matrix used in the calculation of the entries for the vector of coefficients.

23. The apparatus of claim 22, wherein the entries for the vector representing the volatility are stored in the computer database.

24. The apparatus of claim 23, further comprising a computerized pricing engine in communication with the computer database, wherein the pricing engine is programmed to compute a price for a financial instrument based on the entries for the vector representing the volatility.

25. The apparatus of claim 24, wherein the set of basis functions comprises a set of b-spline basis functions.

26. The apparatus of claim 25, wherein the set of b-spline basis functions comprises a set of cubic b-spline basis functions.

27. The apparatus of claim 25, wherein the entries for the vector representing the volatility grid, denoted v, are determined based on the equation:

$$v = v_0 + B \cdot x$$

where $v_0$ is a vector representing a base grid, B is the matrix of the set of basis functions, and x is the vector of coefficients for the set of basis functions.

28. The apparatus of claim 27, wherein the vector (x) of coefficients for the set of basis functions (B) is determined based on the relation:

$$x = A \cdot (J^T W^2 q_{in} + \lambda_2 (L_2 B)^T L_2 v_0)$$

where $$A = (J^T W^2 J + \lambda_1^2 (L_1 B)^T L_1 B + \lambda_2^2 (L_2 B)^T L_2 B + \lambda_3^2 L_3^T L_3)^{-1}$$

and where:
- J is the Jacobian matrix;
- q is a vector whose entries are related to model prices of the calibration instruments;
- W is a diagonal matrix of weights;
- $q_{in}$ is a vector whose entries are related to market prices of the calibration instruments;
- $L_1$ is a first regularization matrix
- $L_2$ is a second regularization matrix;
- $L_3$ is a Tikhonov regularization matrix;
- $\lambda_1$ is a regularization parameter for $L_1$;
- $\lambda_2$ is a regularization parameter for $L_2$; and
- $\lambda_3$ is a regularization parameter for $L_3$.

29. The apparatus of claim 22, wherein the at least one regularization matrix comprises a Tikhonov regularization matrix.

30. The apparatus of claim 22, wherein the at least one regularization matrix comprises a regularization matrix that provides gradient smoothness for the volatility grid.

31. The apparatus of claim 22, wherein the at least one regularization matrix comprises a regularization matrix that provides radial smoothness for the volatility grid.

* * * * *